United States Patent
Barkat et al.

[11] Patent Number: 5,805,672
[45] Date of Patent: Sep. 8, 1998

[54] ACCESSORY VOICE OPERATED UNIT FOR A CELLULAR TELEPHONE

[75] Inventors: Allan Barkat, Ra'anana; Gabriel Hilevitz, Tel Aviv; Ram Alon, Herzlia; Natan Apelstein, Ramat Gan, all of Israel

[73] Assignee: DSP Telecommunications Ltd., Givat Shumel, Iceland

[21] Appl. No.: 905,691

[22] Filed: Aug. 4, 1997

Related U.S. Application Data

[63] Continuation of Ser. No. 385,616, Feb. 8, 1995, abandoned.

[30] Foreign Application Priority Data

Feb. 9, 1994 [IL] Israel ......................................... 108608

[51] Int. Cl.⁶ ....................................................... H04M 1/64
[52] U.S. Cl. ......................... 379/67; 379/355; 455/74.1; 455/563; 455/564
[58] Field of Search .................................. 379/67, 88, 89, 379/354, 355, 58, 59, 60, 61, 62, 63; 455/563, 564, 569, 74.1

[56] References Cited

U.S. PATENT DOCUMENTS

| | | | |
|---|---|---|---|
| 4,496,799 | 1/1985 | Kingen et al. | 379/355 |
| 4,644,107 | 2/1987 | Clowes et al. | 379/354 |
| 4,658,096 | 4/1987 | West, Jr. et al. | 379/63 |
| 4,731,811 | 3/1988 | Dubus | 379/58 |
| 4,737,976 | 4/1988 | Borth et al. | 379/58 |
| 4,852,146 | 7/1989 | Hathcock et al. | 379/355 |
| 4,853,953 | 8/1989 | Fujisaki | 379/88 |
| 4,928,302 | 5/1990 | Kaneuchi et al. | 379/88 |
| 4,945,557 | 7/1990 | Kaneuchi et al. | 379/67 |
| 4,961,212 | 10/1990 | Marui et al. | 379/354 |
| 5,007,081 | 4/1991 | Schmuckal et al. | 379/354 |
| 5,042,063 | 8/1991 | Sakanishi et al. | 379/88 |
| 5,131,029 | 7/1992 | Kunstadt | 379/355 |
| 5,165,095 | 11/1992 | Borcherding | 379/88 |
| 5,222,121 | 6/1993 | Shimada | 379/88 |
| 5,367,556 | 11/1994 | Marui et al. | 379/432 |

OTHER PUBLICATIONS

Rannon et al., "A Chipset for Speech Recognition in Noisy Environment", *IEEE International Conference for Consumer Electronics*, Jun. 1993, pp. 268–269.

*Primary Examiner*—Fan S. Tsang
*Attorney, Agent, or Firm*—Wilson Sonsini Goodrich & Rosati

[57] ABSTRACT

An accessory voice operated unit for a cellular telephone is disclosed. The accessory unit includes a speech signal input/output unit, a voice recognition unit and a processing unit. The voice recognition unit recognizes trained words within the speech signal and the processing unit has telephone numbers associated with the trained words. The processing unit provides standard telephony dialing signals when a trained word has been recognized, wherein the dialing signals correspond to the telephone number associated with the recognized trained word. The accessory unit also includes a hands-free conversation unit which provides hands-free conversation. The processing unit connects the input/output unit to the voice recognition unit during a dialing mode after which, during a conversation mode, the processing unit connects the input/output unit to the hands-free conversation unit.

15 Claims, 3 Drawing Sheets

| 1 NAME | 2 COMMAND | 3 LIST | TRAIN |
|---|---|---|---|
| 4 | 5 | 6 | PLAY |
| 7 | 8 | 9 | DELETE |
| * YES | 0 | # NO | OK/STOP |

ACCESSORY VOICE OPERATED UNIT FOR A CELLULAR TELEPHONE

This application is a continuation of application Ser. No. 08/385,616, filed Feb. 8, 1995, now abandoned.

FIELD OF THE INVENTION

The present invention relates to cellular telephones generally and to units which provide voice dialing and hands-free conversations to such telephones in particular.

BACKGROUND OF THE INVENTION

Cellular telephones are known in the art. Some are installed in vehicles. Others, typically much smaller, are hand-held units which a user can keep near his person, either by keeping it in an attache case or in a pocket, or, for the palm-sized telephones, by storing it in a pocket.

Some of the vehicular cellular telephones include voice dialers. Others include units which provide the capability to conduct hands-free conversation once the connection with the remote site has been established. Both functions are not only convenient to use, but make the use of vehicular cellular telephones considerably safer since the user does not need to use his hands for any part of the telephone conversation.

In some vehicular cellular telephones, the voice dialer and the hands-free device are built into the cellular telephone unit, which adds considerable complexity, and therefore price, to the basic telephone. There also exist "car-kits" which enable a non-vehicular cellular telephone to operate within the vehicle. In some cases, the car-kit includes a hands-free conversation unit. In all these devices, the units for voice dialing and hands-free conversation are limited to use only with the model for which they have been designed.

U.S. Pat. No. 4,737,976 to Borth et al. and U.S. Pat. No. 4,731,811 to Dubus describe cellular telephone units for vehicles which include a voice dialer. U.S. Pat. No. 4,737,976 to Borth et al. also includes a hands-free conversation unit.

U.S. Pat. No. 5,222,121 to Shimada, U.S. Pat. No. 5,165,095 to Borcherding, U.S. Pat. No. 5,042,063 to Sakanishi et al., U.S. Pat. No. 5,007,081 to Schmuckal et al., U.S. Pat. No. 4,945,557 to Kaneuchi et al., U.S. Pat. No. 4,928,302 to Kaneuchi et al., U.S. Pat. No. 4,853,953 to Fujisaki and U.S. Pat. No. 4,644,107 to Clowes et al. describe various voice operated units for regular telephones.

U.S. Pat. No. 4,496,799 to Kingen et al. describes a unit for hands-free conversation.

SUMMARY OF THE PRESENT INVENTION

It therefore is an object of the present invention to provide an accessory voice operated unit which provides voice dialing and hands-free conversation.

In accordance with the present invention, once a pre-programmed phone number has been indicated by voice, the accessory voice operated unit provides standard telephony dialing signals (dual tone multiple frequency (DTMF) or pulse strings) to the cellular telephone. As a result, the accessory voice operated unit is operative with a plurality of telephone models.

Once the connection has been established, the accessory voice operated unit can be switched to a hands-free conversation mode. The hands-free mode utilizes the same speaker and microphone as are used for voice recognition.

In accordance with a preferred embodiment of the present invention, the accessory voice operated unit for a cellular telephone includes a) a speech signal input/output unit, b) a voice recognition unit which recognizes trained words within the speech signal and c) a processing unit having telephone numbers associated with the trained words. The processing unit provides standard telephony dialing signals when a trained word has been recognized. The dialing signals correspond to the telephone number associated with the recognized trained word.

Additionally, in accordance with a preferred embodiment of the present invention, the unit operates with a data interface unit operative to convert between standard telephony signals and internal cellular telephone telephony signals. The data interface unit can either be internal or external to the cellular telephone.

Moreover, in accordance with a preferred embodiment of the present invention, the voice recognition unit is operative in a noisy environment.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
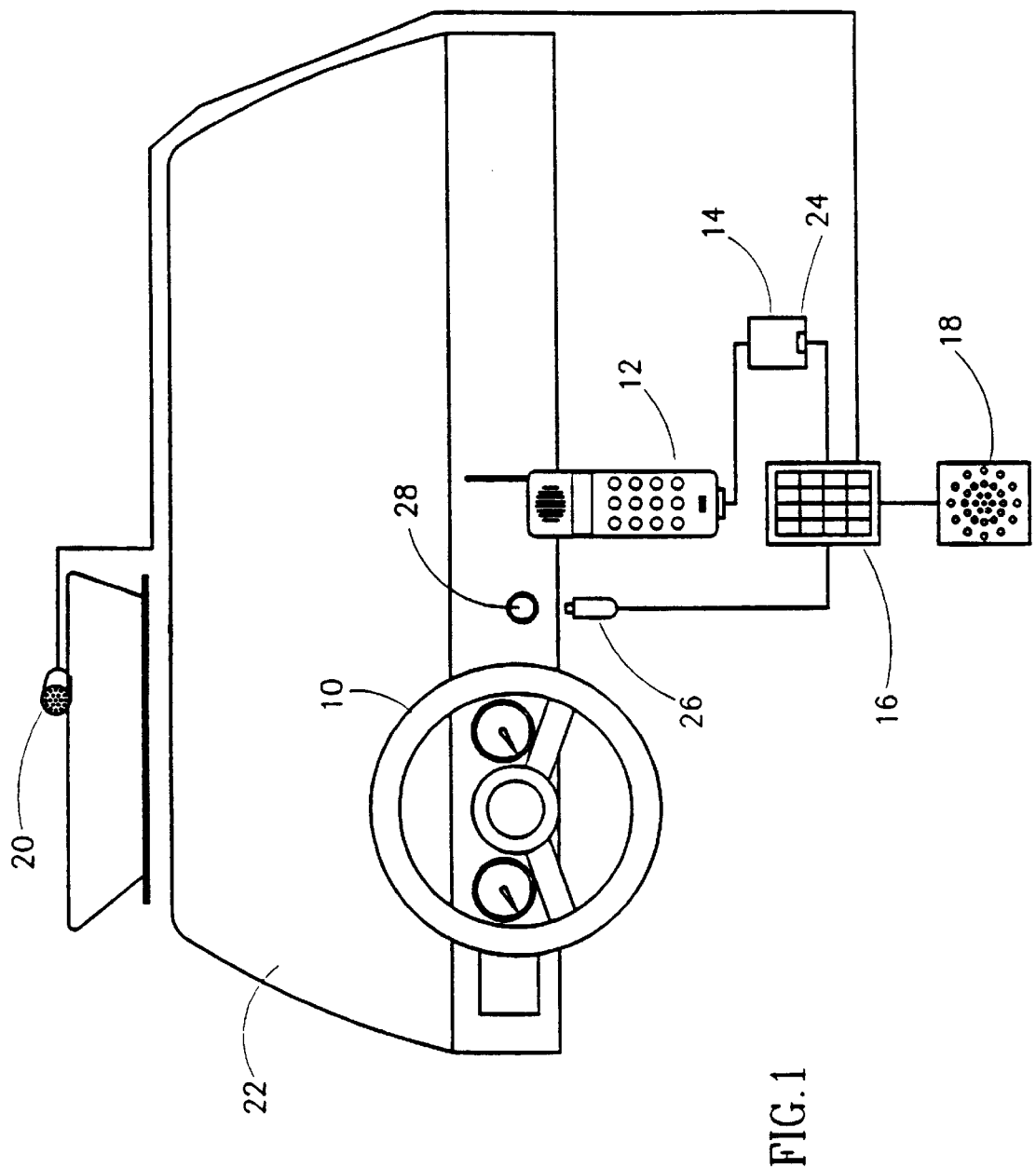
FIG. 1 is a pictorial illustration of a vehicle in which a cellular telephone system comprising a cellular telephone and an accessory voice operated unit are installed, wherein the accessory voice operated unit is constructed and operative in accordance with a preferred embodiment of the present invention.

Reference is now made to FIG. 1 which illustrates a cellular telephone system installed within a motor vehicle, typically near a driver's seat, indicated by steering wheel 10. It will be appreciated that FIG. 1 is by way of example only; the present invention can be installed wherever voice dialling and/or hands-free conversation are desired, such as within the cockpit of an airplane, in a house, in an office or in a workshop.

The cellular telephone system typically comprises a cellular telephone 12, a data adaptor 14 and an accessory voice operated unit formed of a voice processor 16 and a speech signal input/output unit 17 formed of a speaker 18 and a microphone 20.

The cellular telephone 12 is typically formed of any cellular telephone, such as a vehicle installed telephone or a personal mobile cellular telephone, for which a data adaptor 14 (internal or external) has been designed. Exemplary cellular telephones are the vehicular and portable telephones manufactured by AT&T of the U.S.A., AudioVox of the U.S.A. and OKI of the U.S.A. An exemplary data adaptor which operates with the above telephones is the Axcell, commercially available from Spectrum Cellular Inc. of the U.S.A.

Although in FIG. 1 the cellular telephone 12 is located near the driver's seat, it need not be so.

The speaker 18 and microphone 20 are typically located near the driver's seat, such that the driver can easily hear the output of the speaker 18 and can provide relatively loud speech to the microphone 20. In the example shown in FIG. 1, the microphone 20 is shown located above a windshield 22 and the speaker 18 is shown to the side of the driver's seat.

The data adaptor 14 connects to the voice processor 16 via a standard RJ-11 jack 24 and to the cellular telephone 12 via an internally defined interface. In operation, the data adaptor 14 converts between the standard RJ-11 telephony signals provided by the voice processor 16 and the particular, non-standard, telephone signals which the cellular telephone 12 produces for cellular communication.

The accessory voice operated unit of the present invention is thus operable with a multiplicity of different types of cellular telephones. Since the unit of the present invention is not part of the cellular telephone 12 and therefore does not receive power from the telephone 12, the accessory voice operated unit includes a power connector 26, typically for connection to a cigarette lighter jack 28 of the vehicle.

Figures 2, 3:
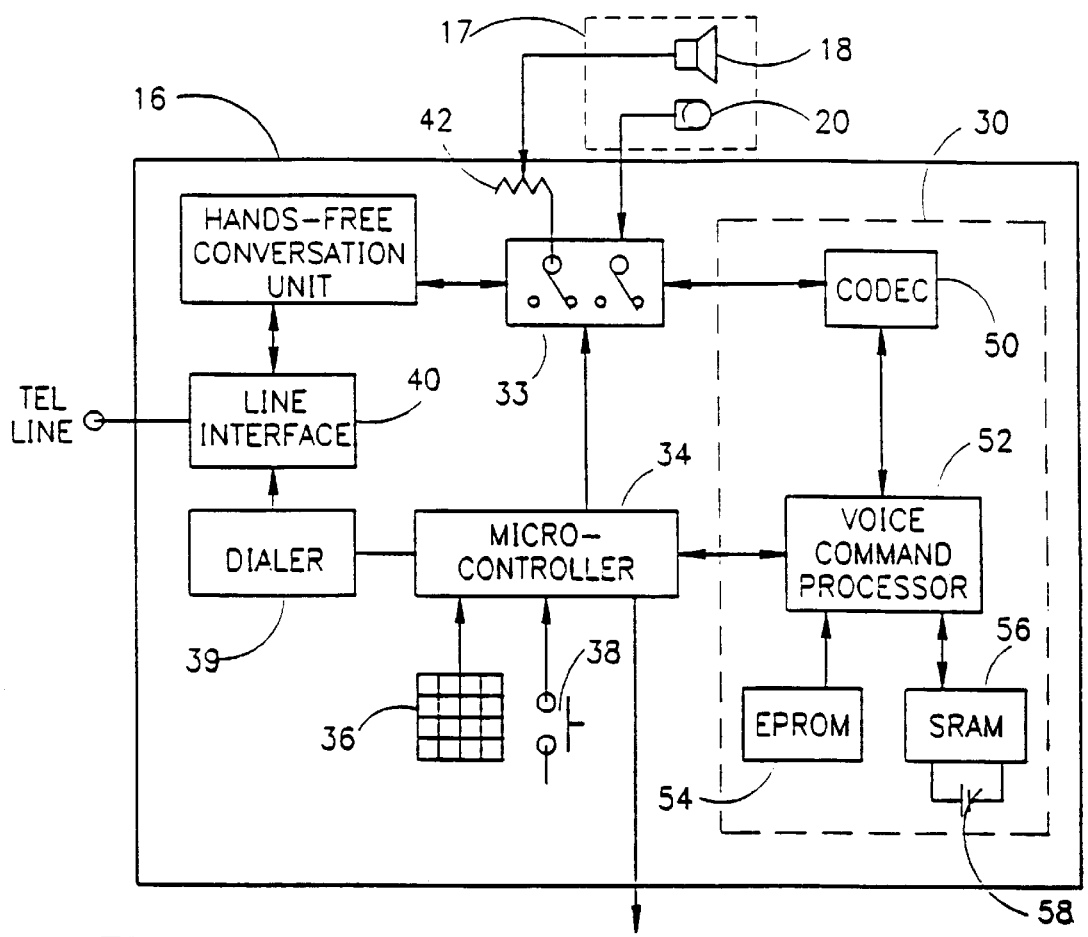
FIG. 2 is a schematic illustration of elements of the accessory voice operated unit of the present invention.
FIG. 3 is a schematic illustration of a keypad forming part of the accessory voice operated unit of FIG. 2.
Figure 4:
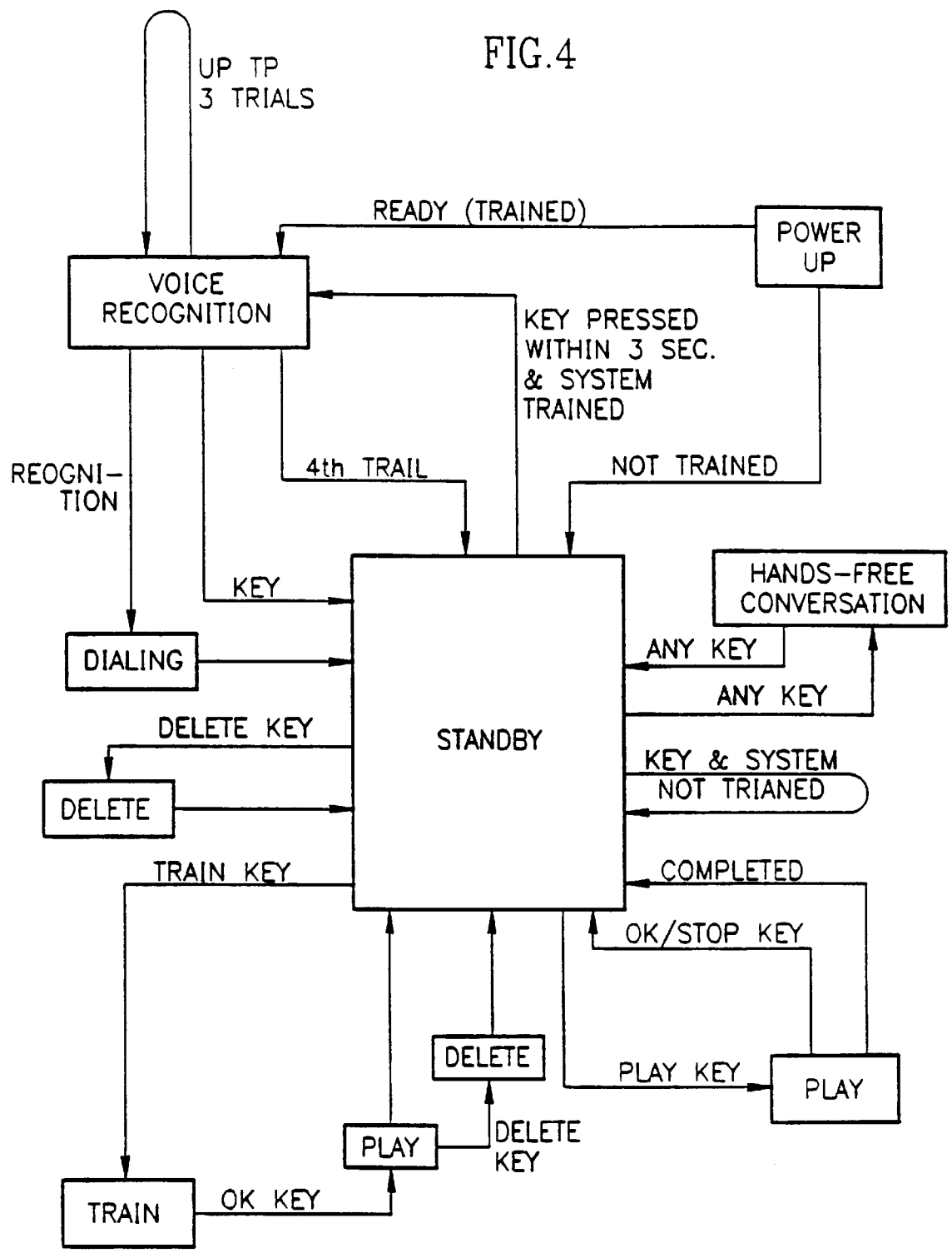
FIG. 4 is a state diagram illustration of the operation of the accessory voice operated unit of FIG. 2.

Reference is now made to FIGS. 2–4. FIG. 2 illustrates, in block diagram format, the elements of the voice processor 16. FIG. 3 illustrates a keypad forming part of the voice processor 16 and FIG. 4 is a state diagram indicating the operation of the processor 16.

The voice processor 16 typically comprises a voice recognition unit 30, an optional hands-free conversation unit 32, a switch 33 switching the input/output unit 17 between units 30 and 32, a microcontroller 34 controlling both unit 30 and switch 33, an input keypad 36, a start button 38, a dialer 39 and a line interface 40. The voice processor 16 can also include a volume control device 42 controlling the volume of the speaker 18.

When the user indicates that he wishes to initiate voice dialing, either by pressing the start button 38 or by saying an appropriate keyword, the microcontroller 34 indicates to switch 33 to connect the input/output unit 17 to the voice recognition unit 30. If the voice processor 16 is connected to a radio within the vehicle, the microcontroller 34 can also provide an "audio mute" signal which is active during the voice dialing procedure and the subsequent telephone conversation to mute the output of the radio.

The voice recognition unit 30 then operates to determine with which person the user wishes to talk. Once the recognition has occurred, the microcontroller 34 sends the correct dialing sequence to dialer 39, such as the UM91531 manufactured by UMC of Taiwan, to provide a dialing signal to the cellular telephone 12 (FIG. 1) via line interface 40 and data adaptor 14. In addition, the microcontroller 34 indicates to switch 33 to connect the input/output unit 17 to the hands-free conversation unit 32.

When the conversation has finished, the user indicates such by pressing the start button. The microcontroller 34 then deactivates the audio mute signal.

The hands-free conversation unit 32 can be any telephone network/speakerphone device, such as the MC 34118 manufactured by Motorola Inc. of the U.S.A.

The voice recognition unit 30 typically comprises a codec 50, a voice command processor 52, a permanent storage unit 54, such as an electrically programmable read only memory (EPROM), a temporary storage unit 56, such as a self-timed random access memory (SRAM), and a backup power source 58, such as a battery, for unit 56.

The voice command processor 52 can be any suitable voice command recognition unit which operates within a noisy environment. Such a unit is described in the article "A Chipset for Speech Recognition in Noisy Environment", *IEEE International Conference for Consumer Electronics*, June 1993, pp. 268–269, written by Zeev M. Rannon, et al. The operations described in the above-identified article are implemented in the D6106 Voice Command Processor commercially available from DSP Telecommunications Ltd. of Givat Shmuel, Israel, the assignees of the present invention.

The voice command processor 52, when in an operating mode, typically prompts a user, via pre-defined vocal messages, to provide a word (or name) to be recognized. If the word is one of the words on which the processor 52 has been trained, the processor 52 provides an indication to the microcontroller 34 as to which word was pronounced.

The pre-defined vocal messages are stored in permanent storage unit 54. The trained words, which can be changed in accordance with the wishes of the user, are stored in the temporary storage unit 56. The processor 52 has a training mode by which the user produces the trained words to be stored in temporary storage unit 56.

The codec 50 converts the analog input speech from the speaker 18 to a digital format utilized by the voice command processor 52. The codec 50 also converts the pre-defined vocal messages and any other voice output to an analog format which is then provided to the microphone 20.

The keypad 36, shown in detail in FIG. 3, provides an interface between the user and the microcontroller 34. It has keys, labelled TRAIN, PLAY, DELETE, OK/STOP, YES and NO, by which the user provides commands to the microcontroller 34. It also has keys, labeled 0–9, by which the user provides the microcontroller 34 with a phone number to associate with a given trained word.

The operation of voice processor 16 is illustrated in FIG. 4. The large circles, labeled POWER UP, VOICE RECOGNITION, PLAY, STANDBY and HANDS-FREE CONVERSATION indicate the different modes of the processor 16. The ovals, labeled TELEPHONE NUMBER, DELETE and PLAY, indicate operations which can occur and the arrows between the modes and operations (e.g. states) indicate how the processor 16 switches between states. The arrows are labeled either with the key to be depressed or with the action which causes the change in state.

With reference to FIG. 4, the following discussion describes the operation of voice processor 16.

Programming and Training

In order to enable voice dialing, the voice processor 16 has to be programmed and trained with the names and telephone numbers which are used for dialing. This is done once before starting to use the device or whenever the user wants to change the training by adding or deleting names and telephone numbers. Training and programming occur in the Train mode, invoked by pressing the TRAIN key. In response, the microcontroller 34 causes switch 33 to connect the input/output unit 17 to the voice recognition unit 30.

Adding new names and telephone numbers: After pressing the TRAIN key, the voice processor 16 instructs the user to say each name twice and to key in the associated telephone number. After the number has been entered, and the OK key pressed, the processor 16 echoes the name of the person and the telephone number just programmed. The user may continue with a new name or may delete the last name programmed (by pressing the DELETE key).

During the training process, the user may be warned by the voice processor 16 to speak louder, or to select a shorter or longer name, or to select a different name (if the voice processor 16 finds it too close to another name already programmed).

Training of command words: In order to operate the voice processor 16, the user has to program some basic command words, such as "cancel", "next", etc. Training of command words is invoked by pressing the TRAIN and COMMAND keys together.

Voice Dialing

Dialing by voice is enabled only if the voice processor 16 has been programmed correctly. If no programming has been done, the user will be warned.

Whenever the voice processor 16 is turned on, it automatically enters the "voice dialing mode", connecting the input/output unit 17 to the voice recognition unit 30. It then prompts the user that it is ready to accept a name. It can also enter the voice dialing mode when, in standby mode, the user presses one or more keys or the START button for more than two seconds.

The user should respond to the system within 3 seconds. If he fails to do this, the voice processor 16 re-initiates the dialing mode and notifies the user that it is ready again. After 3 trials, the voice processor 16 aborts the dialing mode and enters the standby mode.

After the user has responded with a name, the system reacts in one of the following ways:

In the case of a positive recognition, the voice recognition unit 30 echoes the recognized word or name and provides the name to the microcontroller 34. The microcontroller 34 provides the associated telephone number to the dialer 39 which produces the corresponding standard telephony dialing signals (DTMF or pulse) to the line interface 40. The cellular telephone completes the dialing procedure and establishes communication, if possible.

If the user is not satisfied with the recognized and echoed name, he may interrupt the procedure by saying "next", to select the next best candidate from the name list, or by saying "cancel", to abort the voice dialing mode. If "cancel" is selected the dialing procedure is aborted and the voice processor 16 enters a standby mode. If "next" is selected, the voice processor 16 echoes the next candidate and repeats the operation described hereinabove. If "next" is selected again, the voice processor 16 aborts the dialing mode.

If no positive recognition occurred, because the voice input was cut too short, or too long, or too low compared to the background noise, the voice processor 16 asks the user to repeat the name and provides instructions on how to correct the problem. The voice processor 16 lets the user repeat the name up to 3 times, after which it notifies the user that it cannot recognize the name. It then enters the standby mode.

Conversation Mode

After the dialing procedure has been completed, the voice recognition unit 30 enters a standby mode, the audio mute signal is produced, and conversation is enabled using either the handset or the hands-free conversation unit 32. To do so, the microcontroller 34 indicates to switch 33 to connect the input/output unit 17 to unit 32. If the dialing was performed via the handset, hands-free conversation can be enabled by briefly pressing on any key on the key-pad or on the START button. To disable the hands-free mode, a key (any one) or the START button is pressed again. Volume control 42 is used to adjust the voice level at the speaker output.

Play Mode

This mode is invoked by pressing the PLAY key. In response, the voice processor 16 plays the programmed names and associated telephone numbers. The user is given enough time between each name so that he can delete the last one (DELETE key) or stop the playback (OK/STOP key).

It will be appreciated that the present invention provides voice dialing and/or hands-free conversation in an accessory unit for a cellular telephone.

It will be appreciated by persons skilled in the art that the present invention is not limited to what has been particularly shown and described hereinabove. Rather the scope of the present invention is defined by the claims which follow:

We claim:

1. An accessory voice operated unit connectable to a cellular telephone via a data adaptor capable of receiving standard telephony signals and converting said standard telephony signals to cellular telephony signals, said unit comprising:

a speech signal input for receiving voice commands and conversation signals;

a voice recognition unit connectable to said speech signal input for recognizing trained command words within said voice commands; and a processing unit connectable to said voice recognition unit and connectable to said data adaptor for providing standard telephony signals to said data adaptor corresponding to a telephone number when said voice recognition unit recognizes a trained command word associated with said telephone number.

2. The accessory voice operated unit according to claim 1, further comprising a speech signal output, said data adaptor converting cellular telephony signals from said cellular telephone to standard telephony signals and said processing unit converting said standard telephony signals from said data adaptor to speech output signals.

3. The accessory voice operated unit according to claim 2, further comprising a hands-free conversation unit for providing hands-free conversation through said speech input and speech output units.

4. The accessory voice operated unit according to claim 3 and also comprising a switch controlled by said processing unit for switching said speech input and output units between said voice recognition unit, operative at least during a dialing mode, and said hands-free conversation unit, operative during a conversation mode.

5. An accessory voice operated unit connectable to a cellular telephone system including a voice recognition unit, said accessory voice operated unit comprising:

a processing unit for converting voice recognition unit signals and conversation signals to standard telephony signals; and a data adaptor connectable to said processing unit for receiving said standard telephony signals from said processing unit and converting said standard telephony signals to cellular telephony signals.

6. The accessory voice operated unit according to claim 5 wherein said data adaptor converts cellular telephony signals from said cellular telephone to standard telephony signals and said processing unit converts said standard telephony signals from said data adaptor to speech output signals.

7. The accessory voice operated unit according to claim 5, further comprising a speech signal input which transmits speech signs to said processing unit, and a speech signal output which receives speech output signals from said processing unit.

8. The accessory voice operated unit according to claim 7, further comprising a hands-free conversation unit for providing hands-free conversation through said speech input and speech output units.

9. The accessory voice operated unit according to claim 8 and also comprising a switch controlled by said processing unit for switching said speech input and output units between said voice recognition unit, operative at least during a dialing mode, and said hands-free conversation unit, operative during a conversation mode.

10. A cellular telephone system comprising:

a speech signal input for receiving voice commands and conversation signals;

a voice recognition unit connectable to said speech signal input for recognizing trained command words within said voice commands;

a processing unit connectable to said voice recognition unit for providing standard telephony signals corresponding to a telephone number when said voice recognition unit recognizes a trained command word associated with said telephone number;

a data adaptor connectable to said processing unit for receiving said standard telephony signals from said processing unit and converting said standard telephony signals to cellular telephony signals; and a cellular telephone connectable to said processing unit via said data adaptor for receiving said cellular telephony signals from said data adaptor.

11. The cellular telephone system according to claim 10, wherein the data adaptor is internal to the cellular phone.

12. The cellular telephone system according to claim 10, wherein the data adaptor is external to the cellular phone.

13. The cellular telephone system according to claim 10, further comprising a speech signal output, said data adaptor converting cellular telephony signals from said cellular telephone to standard telephony signals and said processing unit converting said standard telephony signals from said data adaptor to speech output signals.

14. The cellular telephone system according to claim 10, further comprising a hands-free conversation unit for providing hands-free conversation through said speech input and speech output units.

15. The cellular telephone system according to claim 14 and also comprising a switch controlled by said processing unit for switching said speech input and output units between said voice recognition unit, operative at least during a dialing mode, and said hands-free conversation unit, operative during a conversation mode.

* * * * *

UNITED STATES PATENT AND TRADEMARK OFFICE
CERTIFICATE OF CORRECTION

PATENT NO. : 5,805,672
DATED : September 8, 1998
INVENTOR(S) : Allan Barkat, Gabriel Hilevitz, Ram Alon, Natan Apelstein It is certified that error appears in the above-identified patent and that said Letters Patent is hereby corrected as shown below:

On the title page, item

[73] Assignee: delete "Iceland" and insert --Israel--

Signed and Sealed this

Eighth Day of February, 2000

Attest:

Q. TODD DICKINSON

Attesting Officer

Commissioner of Patents and Trademarks